UNITED STATES PATENT OFFICE.

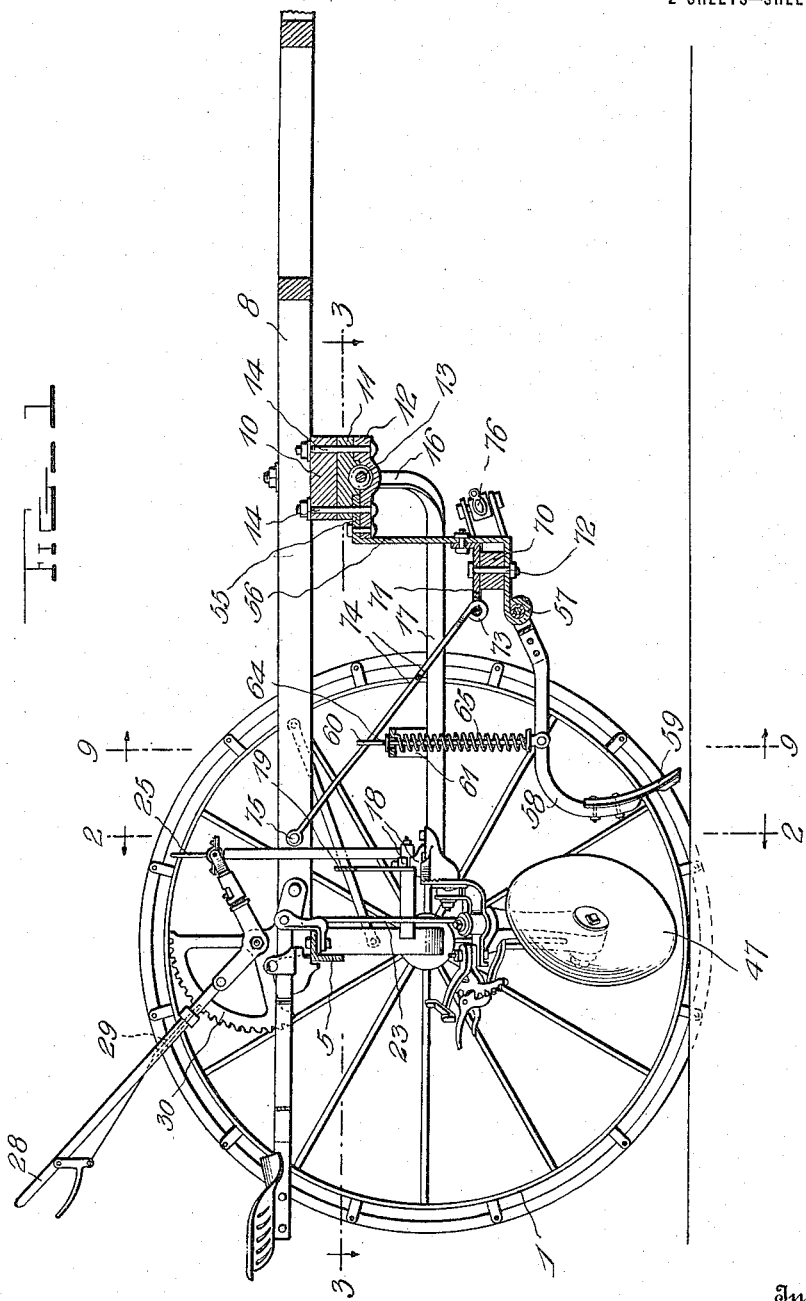

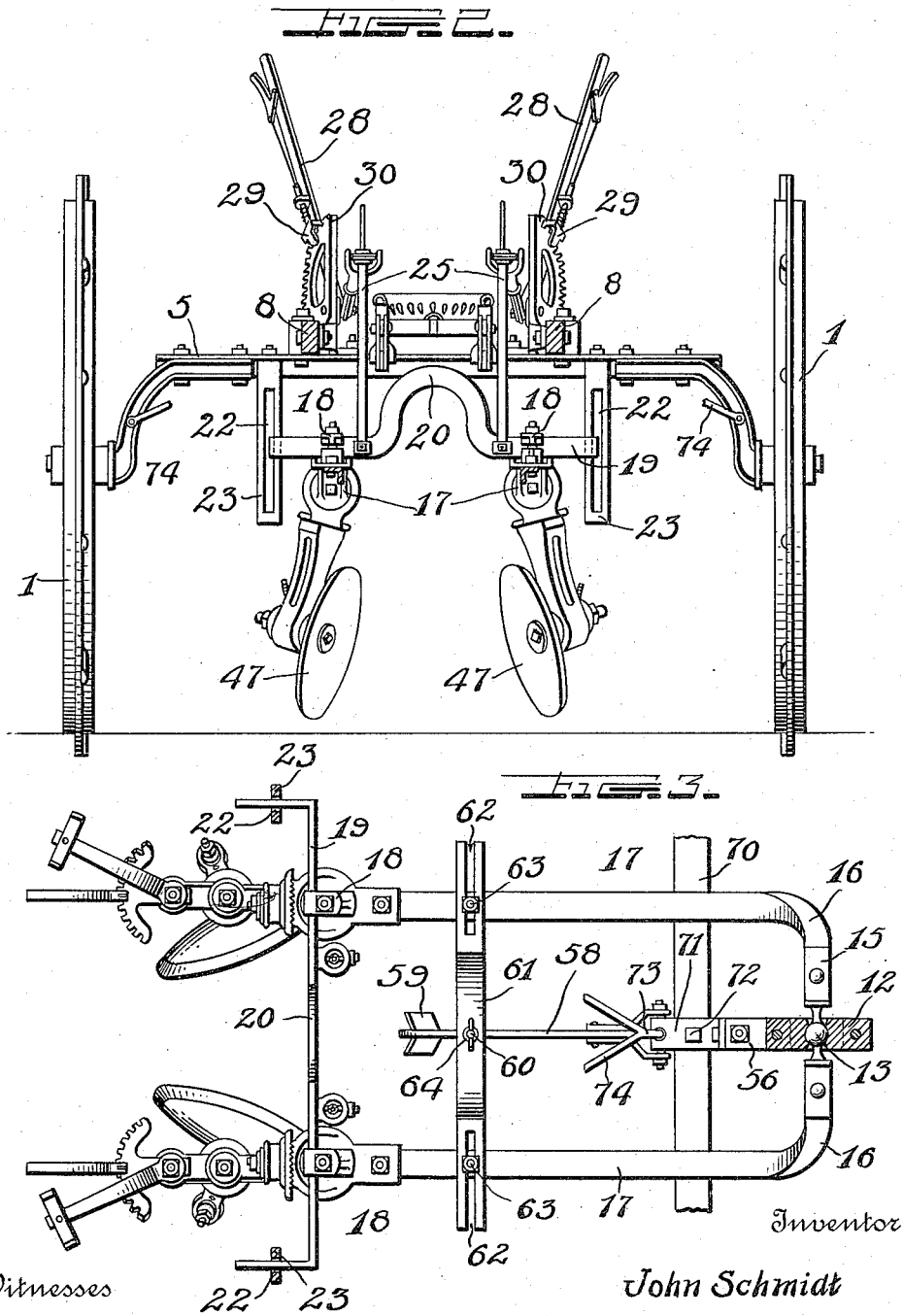

JOHN SCHMIDT, OF PADUCAH, KENTUCKY.

LAND-RIDGING DEVICE.

1,160,456.  Specification of Letters Patent.  Patented Nov. 16, 1915.

Application filed January 21, 1915. Serial No. 3,613.

*To all whom it may concern:*

Be it known that I, JOHN SCHMIDT, a citizen of the United States, residing at Paducah, in the county of McCracken and State of Kentucky, have invented certain new and useful Improvements in Land-Ridging Devices; and I do declare the following to be a full, clear, and exact description of the invention, such as will enable others skilled in the art to which it appertains to make and use the same.

My invention relates broadly to improvements in agricultural implements and more specifically to a machine to form ridges for planting numerous kinds of vegetables but more particularly sweet potatoes.

The main object of the invention is to provide a comparatively simple yet very efficient device for accomplishing the above result.

A further object is to provide a support for a supplemental draw bar and to so locate said support as to allow the same to constitute means whereby a double-tree may be attached.

Yet another object is to connect an earth loosening implement with which the machine is equipped, with a pair of ridging implements and to provide means whereby the latter may be raised and lowered, thereby raising and lowering the earth loosening implement simultaneously.

A still further object of the invention is to provide simple and efficient means for guiding the ridging implements in their vertical movement.

With the above and minor objects in view, the invention resides in certain novel features of construction and combination hereinafter described and claimed and shown in the drawings wherein:

Figure 1 is a central vertical longitudinal section through a machine constructed in accordance with my invention: Fig. 2 is a vertical transverse section taken substantially on the plane of the line 2—2 of Fig. 1: Fig. 3 is a horizontal section as seen on the line 3—3 of Fig. 1.

In the accompanying drawings, a pair of supporting wheels 1 is shown mounted upon an arched axle 5 projecting forwardly from which is a double tongue formed of a pair of forwardly converging bars 8 which are connected by the bar 10 which is preferably located only a slight distance in advance of the wheels 1. Secured in contact with the under side of the bar 10, is one section 11 of a bearing, said section having a substantially semi-spherical recess in its underside which coacts with a similar recess in a plate 12 for retaining a ball 13 in position, bolts 14 being passed through the members 11 and 12 and through the bar 10 as clearly seen in Fig. 1. The ball 13 (seen more particularly in Fig. 3) carries laterally projecting plates 15 which are riveted or otherwise attached to the upwardly and inwardly turned ends 16 of a pair of angle iron draw bars 17 which, by suitable connections with the plates 15, are allowed to be adjusted laterally to vary the distance between a pair of disks 47 carried by the rear ends of said bars, during which movement, a pair of sectional clamps 18 moves upon a spacing bar 19 whose center is preferably arched as seen at 20 in Fig. 2 while its free ends are bent rearwardly and extended through upright slots 22 in vertical plates 23 which depend from the arched axle. By reference more particularly to Figs. 1 and 2, it will be seen that upright links 25 are pivotally connected with the opposite end portion of the spacing bar 19, at their lower ends, while their upper ends are pivoted to the front ends of raising and lowering levers 28. These levers may be locked in adjusted position by pawls 29 engaging the teeth of segmental racks 30 which are here shown as secured upon the arched axle 5 and as being also secured to the bars of the double tongue.

By the construction above described, it will be seen that proper manipulation of the levers 28 will raise and lower the draw bars 17 and disks 47 carried thereby. These disks, when set as shown in the drawings, are adapted to draw the earth being worked inwardly, thus forming a ridge. Before this operation takes place, however, the soil is loosened by means now to be described.

Interposed between the rear portions of the members 11 and 12 and secured to a rearward extension of the latter by a bolt or other suitable fastener, is an attaching plate 55 from whose rear edge a reversed L-shaped bracket 56 depends, the horizontal arm of said bracket extending rearwardly and being provided with a knuckle 57 to which the forward end of a supplemental draw bar or draft beam 58 is pivotally connected, the rear end of said supplemental draw bar being curved downwardly and carrying a shovel 59 designed to loosen the earth when lowered. Rising from the beam 58 and pivoted thereto, is a link 60 whose upper end projects slidably through an opening in a second transverse spacing bar 61, the central portion of the latter being preferably arched as seen in Figs. 1 and 3 while its opposite ends are provided with slots 62 through which, and the draw bars 17, clamping bolts 63 are passed. The link 60 is provided with a suitable stop 64 above the bar 61 and is surrounded by a coil spring 65 below said bar, said spring being interposed between a suitable stop near the lower end of the link and the center of the bar 61. By this construction, it will be seen, that downward movement imparted to the bars 17 by the levers 28 will, through the instrumentality of the coil spring 65, likewise force the beam 58 downwardly thereby projecting the shovel 59 into the soil. On the other hand, when said beams are raised, the link 60 will raise the supplemental beam 58 as will be readily understood.

In addition to the parts so far described, it becomes expedient to provide simple means whereby the doubletree 70 may be attached to the bracket 56. For this purpose, a second horizontal arm 71 is secured to the upright arm of said bracket and spaced above the horizontal arm thereof, said doubletree being interposed between the two horizontal arms and being pivotally held in this position by an upright pivot bolt 72. It will be noted, that the rear ends of the two horizontal arms, project beyond the double-tree 70 and that the hooked end 73 of a V-shaped bracing rod 74 is passed through the rear end of the arm 71, the other ends of said rod being secured at 75 to the tongue of the device. As is common in devices of this character, swingle trees 76 are provided on the opposite ends of the double tree 70, these swingle trees being preferably disposed as shown in the drawings.

A machine constructed as above described, may be employed in the manner now to be set forth in detail, or in any other way in which it will operate to advantage.

The entire machine is drawn forwardly over the soil with the disks 47 and the shovel 59 lowered, the latter now loosening the earth and the disks then drawing the soil inwardly from both sides of the loosened earth and piling the same in a complete sharp ridge across the field, at a single trip. It will therefore be evident that three times the amount of work can be done with the machine above described as that accomplished by an ordinary plow since with the latter it is necessary to make three trips across the field to produce a complete ridge. This is a very important feature of the invention, since it will be evident that but one-third the amount of time is needed to ridge a field when my improved machine is employed, as that necessary when using a plow for the same purpose.

I claim:

1. The combination with a wheel supported axle and a tongue projecting forwardly therefrom, of a pair of upright slotted plates depending from the axle, a transverse spacing bar having its ends slidably mounted in the slots of said plates, a pair of draw bars connected to the spacing bar, a pivotal connection between the free ends of the draw bars and the tongue, independent earth working implements carried by the rear ends of said draw bars, and means whereby the spacing bar may be raised.

2. The combination with a wheel supported axle and a tongue projecting forwardly therefrom, of a pair of upright slotted plates depending from the axle, a transverse spacing bar having its ends bent laterally and extended through the slots of said plates, a pair of clamps adjustably mounted on said spacing bar, a pair of draw bars to which said clamps are secured, a pivotal connection between the free ends of said draw bars and the tongue, independent earth working implements carried by the rear ends of said draw bars, and means whereby the spacing bar may be raised and lowered.

3. The combination with a wheel supported axle and a member projecting forwardly therefrom, of a pair of draw bars having their forward ends pivotally connected with said member, earth ridging implements carried by the rear ends of said bars, means whereby said rear ends may be raised and lowered, a transverse bar secured to said draw bars, a spring beneath said bar, a supplemental draw bar beneath the lower end of said spring and carrying an earth loosening implement, and a pivotal mounting for the forward end of said supplemental draw bar.

4. The combination with a wheel supported axle and a tongue projecting forwardly therefrom, of a pair of transversely adjustable longitudinal draw bars having their forward ends pivotally connected with the tongue, means for raising the rear ends of said draw bars, ridge forming implements carried by said rear ends, a transverse bar having slots in its opposite ends, fastening elements passing through said slots and into the intermediate portions of the draw bars, a supplemental draw bar beneath said transverse bar, a pivotal mounting for the forward end of said supplemental bar, an earth loosening implement carried by the rear end of said supplemental bar, a link rising from said last-named bar and passing slidably through said transverse bar, and a coil spring interposed between said transverse bar and the supplemental draw bar.

5. The combination with a wheel supported axle and a tongue projecting forwardly therefrom, of a pair of draw bars having their forward ends pivotally connected to the tongue, means for raising the rear ends of said draw bars, earth ridging implements carried by the rear ends of said bars, a transverse bar having its opposite ends secured to said draw bars, a supplemental draw bar beneath said transverse bar, a pivotal mounting for the forward end of said supplemental draw bar, an earth loosening implement carried by the rear end thereof, a link rising from said supplemental draw bar and passing slidably through said transverse bar, a stop on the upper end of said link, and a coil spring interposed between the transverse bar and said supplemental draw bar.

6. The combination with a wheel supported axle and a tongue projecting forwardly therefrom, of a pair of draw bars having their forward ends pivotally connected with the tongue, means for raising the rear ends of said draw bars, earth ridging implements carried by said rear ends, a supplemental draw bar beneath said first-named draw bars and carrying an earth loosening implement, a pivotal support for said supplemental draw bar and operating connections between the first-named draw bars and the supplemental draw bar for actuating the same simultaneously.

In testimony whereof I have hereunto set my hand in presence of two subscribing witnesses.

JOHN SCHMIDT.

Witnesses:
W. V. BRADSHAW, Jr.,
W. J. PIERCE.

Copies of this patent may be obtained for five cents each, by addressing the "Commissioner of Patents, Washington, D. C."